US012502147B2

United States Patent
Nieminen et al.

(10) Patent No.: US 12,502,147 B2
(45) Date of Patent: Dec. 23, 2025

(54) APPARATUS, METHOD AND COMPUTER PROGRAM FOR PROCESSING COMPUTED TOMOGRAPHY (CT) SCAN DATA

(71) Applicant: OULUN YLIOPISTO, Oulu (FI)

(72) Inventors: Miika Nieminen, Oulu (FI); Mikael Brix, Oulu (FI); Juuso Ketola, Oulu (FI); Satu Inkinen, Oulu (FI)

(73) Assignee: OULUN YLIOPISTO, Oulu (FI)

( * ) Notice: Subject to any disclaimer, the term of this patent is extended or adjusted under 35 U.S.C. 154(b) by 299 days.

(21) Appl. No.: 18/013,214

(22) PCT Filed: Jun. 24, 2021

(86) PCT No.: PCT/FI2021/050492
§ 371 (c)(1),
(2) Date: Dec. 27, 2022

(87) PCT Pub. No.: WO2022/003245
PCT Pub. Date: Jan. 6, 2022

(65) Prior Publication Data
US 2023/0270391 A1 Aug. 31, 2023

(30) Foreign Application Priority Data
Jun. 29, 2020 (FI) ..................... 20205691

(51) Int. Cl.
*A61B 6/03* (2006.01)
*A61B 6/00* (2024.01)
*G06T 11/00* (2006.01)

(52) U.S. Cl.
CPC ............ *A61B 6/032* (2013.01); *A61B 6/5205* (2013.01); *A61B 6/5258* (2013.01); *G06T 11/005* (2013.01)

(58) Field of Classification Search
CPC ..... A61B 6/032; A61B 6/5205; A61B 6/5258; G06T 11/005
See application file for complete search history.

(56) References Cited

U.S. PATENT DOCUMENTS

| 6,915,005 B1 | 7/2005 | Ruchala et al. |
| 2002/0136439 A1 | 9/2002 | Ruchala et al. |

(Continued)

FOREIGN PATENT DOCUMENTS

| WO | 02/073519 | 9/2002 |
| WO | 2009/060351 | 5/2009 |
| WO | 2017/214048 | 12/2017 |

OTHER PUBLICATIONS

International Search Report dated Oct. 1, 2021, for PCT/FI2021/050492, 4 pp.

(Continued)

*Primary Examiner* — Iriana Cruz
(74) *Attorney, Agent, or Firm* — Nixon & Vanderhye PC

(57) ABSTRACT

Apparatus, method and computer program code for processing computed tomography (CT) scan data is disclosed. The method includes: receiving (202) a real sinogram from a CT scanning of a region of interest of a subject; receiving (204) shape data representing anatomic contours of a body part containing the region of interest of the subject; retrieving (206) a template sinogram from among a plurality of stored template sinograms based on the anatomic contours of the body part; performing (210) an image registration between the real sinogram and the template sinogram to obtain a registered template sinogram; and generating (212) an enlarged sinogram from the real sinogram by adding the non-overlapping parts from the registered template sinogram.

20 Claims, 7 Drawing Sheets

(56) References Cited

U.S. PATENT DOCUMENTS

| | | | |
|---|---|---|---|
| 2006/0002504 A1 | 1/2006 | De Man et al. | |
| 2009/0074278 A1* | 3/2009 | Beaulieu | A61B 6/583 382/131 |
| 2009/0238337 A1* | 9/2009 | Wang | G06T 11/005 378/62 |
| 2011/0096968 A1 | 4/2011 | Deykoon | |
| 2011/0216180 A1 | 9/2011 | Pasini | |
| 2015/0103969 A1* | 4/2015 | Flohr | G16H 50/20 382/256 |
| 2016/0143604 A1* | 5/2016 | Lou | G06T 7/337 378/20 |
| 2018/0137656 A1* | 5/2018 | Li | A61B 6/037 |
| 2018/0360406 A1 | 12/2018 | Haga et al. | |
| 2019/0274641 A1* | 9/2019 | Joskowicz | G06T 11/006 |
| 2021/0290193 A1* | 9/2021 | Zhou | A61B 6/4014 |
| 2022/0160323 A1* | 5/2022 | Maur | A61B 6/584 |

OTHER PUBLICATIONS

Written Opinion of the ISA dated Oct. 1, 2021, for PCT/FI2021/050492, 5 pp.
International Preliminary Report on Patentability dated Sep. 12, 2022, for PCT/FI2021/050492, 12 pp.
Finnish Search Report dated Jan. 29, 2021, for FI 20205691, 3 pp.
Daniel Kolditz et al., "Comparison of extended field-of-view reconstructions in C-arm flat-detector CT using patient size, shape or attenuation information", Physics in Medicine and Biology, vol. 56, No. 1, Nov. 30, 2010, pp. 39-56.
Kenneth J. Ruchala et al., "Methods for improving limited field-of-view radiotherapy reconstructions using imperfect a priori images", Medical Physics AIP, vol. 29, No. 11, Nov. 1, 2022, pp. 2590-2605.
Heusser, T. et al. "Prior-based artifact correction (PBAC) in computed tomography", Medical Physics John Wiley and Sons Ltd, Feb. 2014, vol. 41, No. 2, DOI:10.1118/1.4851536; pp. 021906-1-021906-16.

* cited by examiner

APPARATUS, METHOD AND COMPUTER PROGRAM FOR PROCESSING COMPUTED TOMOGRAPHY (CT) SCAN DATA

CROSS-REFERENCE TO RELATED APPLICATIONS

This application is the U.S. national phase of International Application No. PCT/FI2021/050492 filed Jun. 24, 2021, which designated the U.S. and claims priority to FI 20205691 filed Jun. 29, 2020, the entire contents of each of which are hereby incorporated by reference.

FIELD

Various embodiments relate to an apparatus, method and computer program code for processing computed tomography (CT) scan data.

BACKGROUND

A computed tomography (CT) scan uses computer-processed combinations of many X-ray (or Röntgen) measurements taken from different angles processed into a sinogram (two-dimensional representation of three-dimensional projection data, in the form of an array of data containing the projections), which is reconstructed into cross-sectional (tomographic) images (or slices) from a body part of a subject. The CT geometry used to perform the image reconstruction may be 2D or 3D, whereas the beam geometry may be parallel-beam, fan-beam, cone-beam, or another geometry type known for the skilled person.

In order to minimize radiation exposure, the CT scan may be directed to a region of interest within the body part. Such region of interest CT-scan causes causes the sinogram to become truncated due to missing measurements of the body part from the tissues surrounding the region of interest. Such truncation causes artefacts into the reconstructed image.

U.S. Pat. No. 6,915,005 B1 discloses a method of augmenting a tomographic projection image of a patient using a limited data from a first image and complete data from a second image.

WO 2017/214048 A1 discloses systems and method for automatic sinogram completion based on a photographic acquisition and a micro CT acquisition, or two CT acquisitions Thorsten Heusser, Marcus Brehm, Ludwig Ritschl, Stefan Sawall, and Marc Kachelriess: Prior-based artifact correction (PBAC) in computed tomography, Med. Phys. 41 (2) (2014) discloses a correction method for missing or corrupt data using prior data from a different scan of the same patient or from patient data base.

Daniel Kolditz, Michael Meyer, Yiannis Kyriakou and Willi A Kalender: Comparison of extended field-of-view reconstructions in C-arm flat-detector CT using patient size, shape or attenuation information, Phys. Med. Biol. 56 (2011) discloses three truncation correction approaches for extended field-of-view reconstructions: an FDCT-based method estimates the patient size and shape from the truncated projections by fitting an elliptical model to the raw data in order to apply an extrapolation, in a camera-based approach the patient is sampled with an optical tracking system and this information is used to apply an extrapolation, and in a CT-based method the projections are completed by artificial projection data obtained from the CT data acquired in an earlier exam.

BRIEF DESCRIPTION

According to an aspect, there is provided subject matter of independent claims. Dependent claims define some embodiments.

One or more examples of implementations are set forth in more detail in the accompanying drawings and the description of embodiments.

LIST OF DRAWINGS

Some embodiments will now be described with reference to the accompanying drawings, in which FIG. 1 illustrates embodiments of an apparatus for processing CT scan data;

Figure 4:
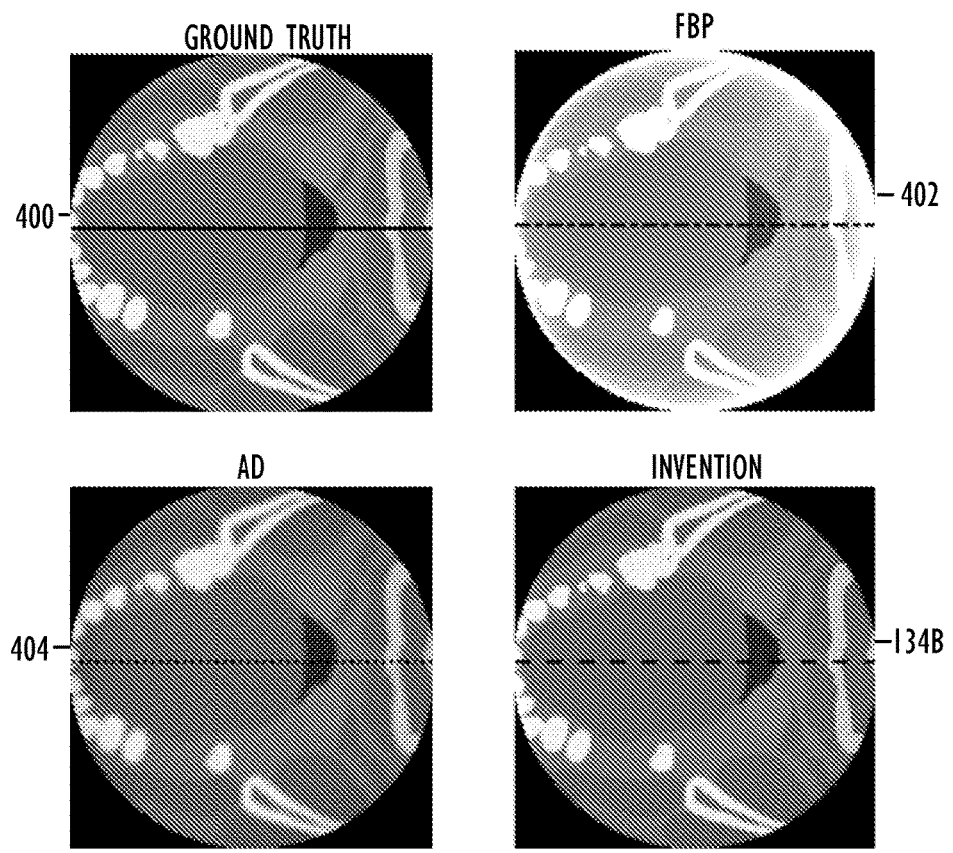
Figure 4:
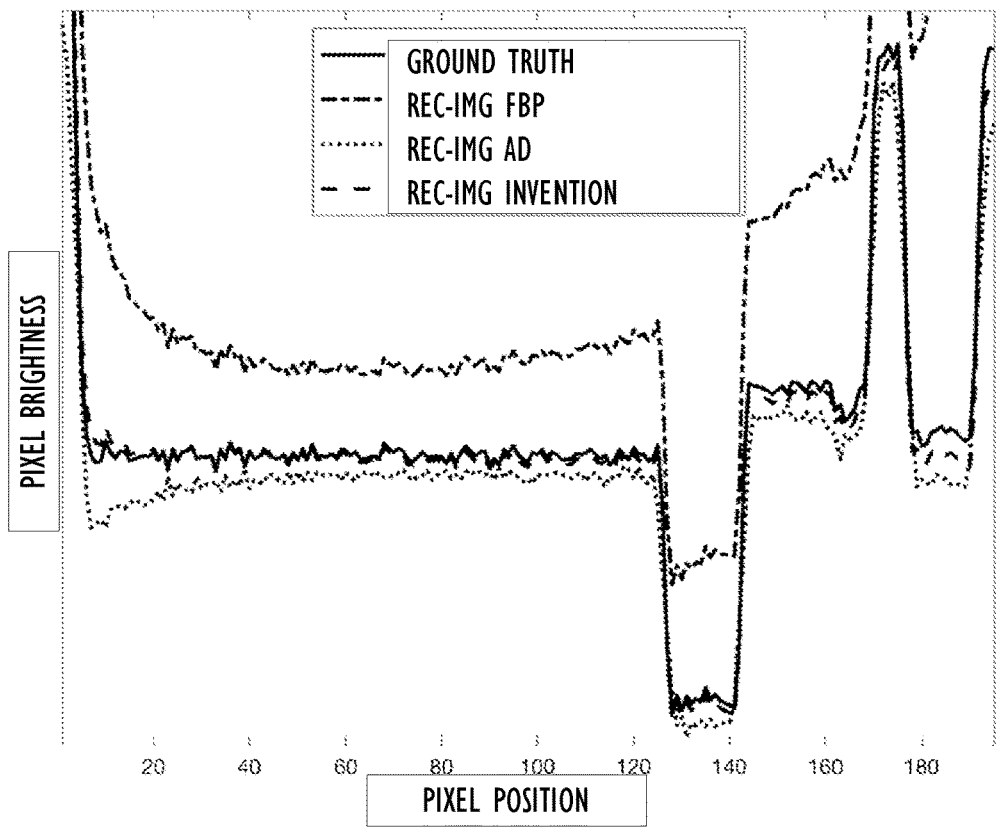
Figure 5:
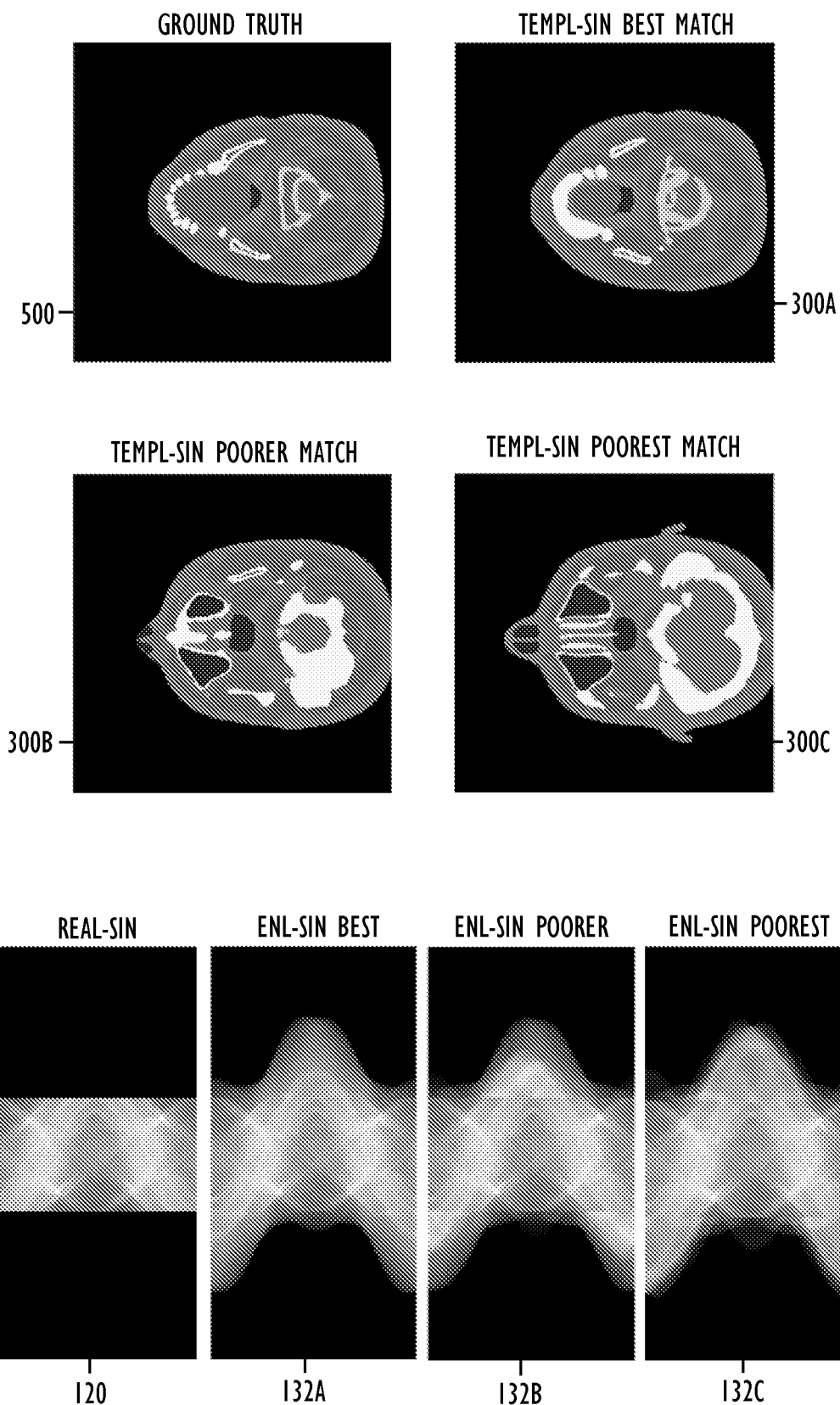
Figure 6:
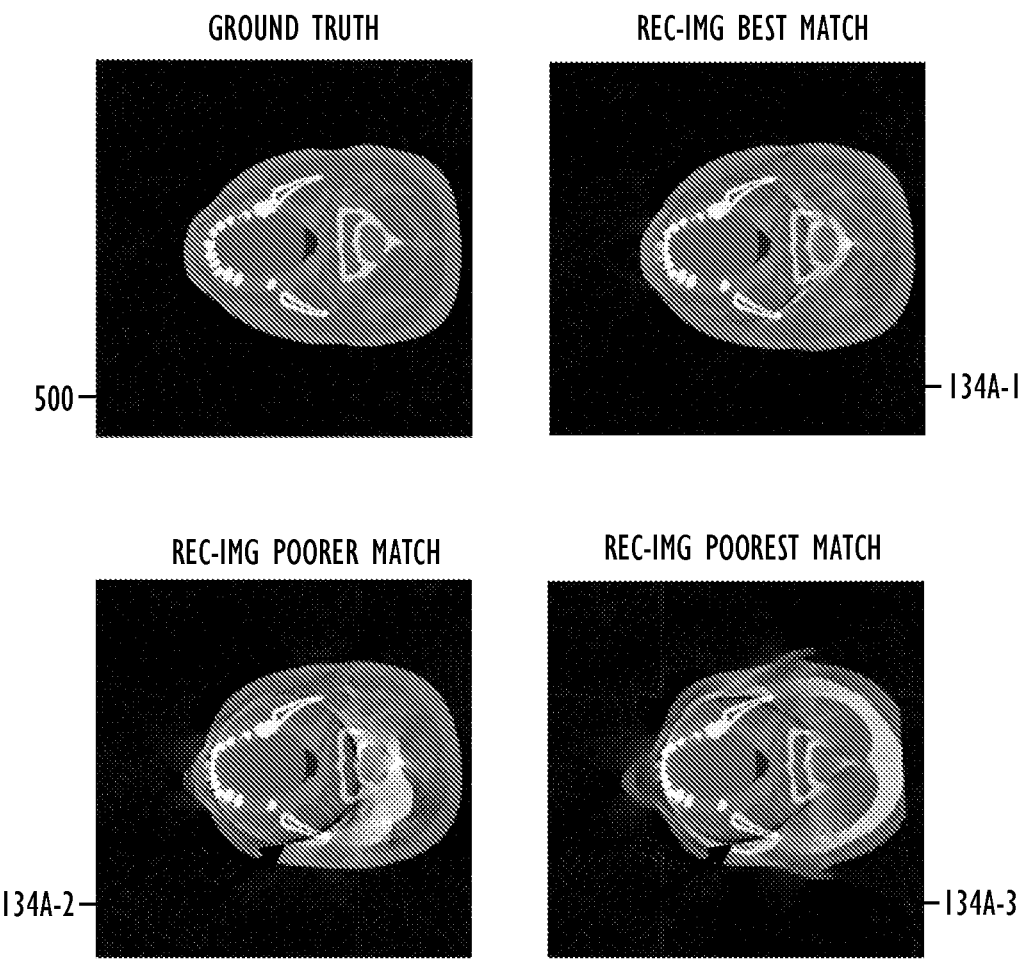
Figure 7:
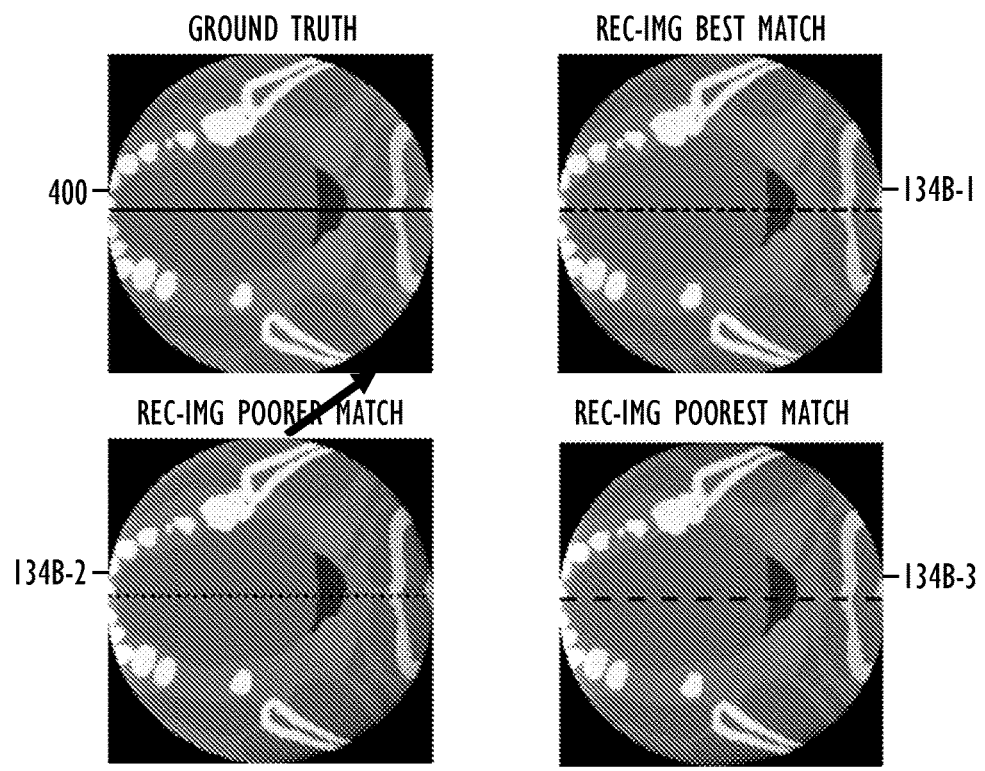
Figure 7:
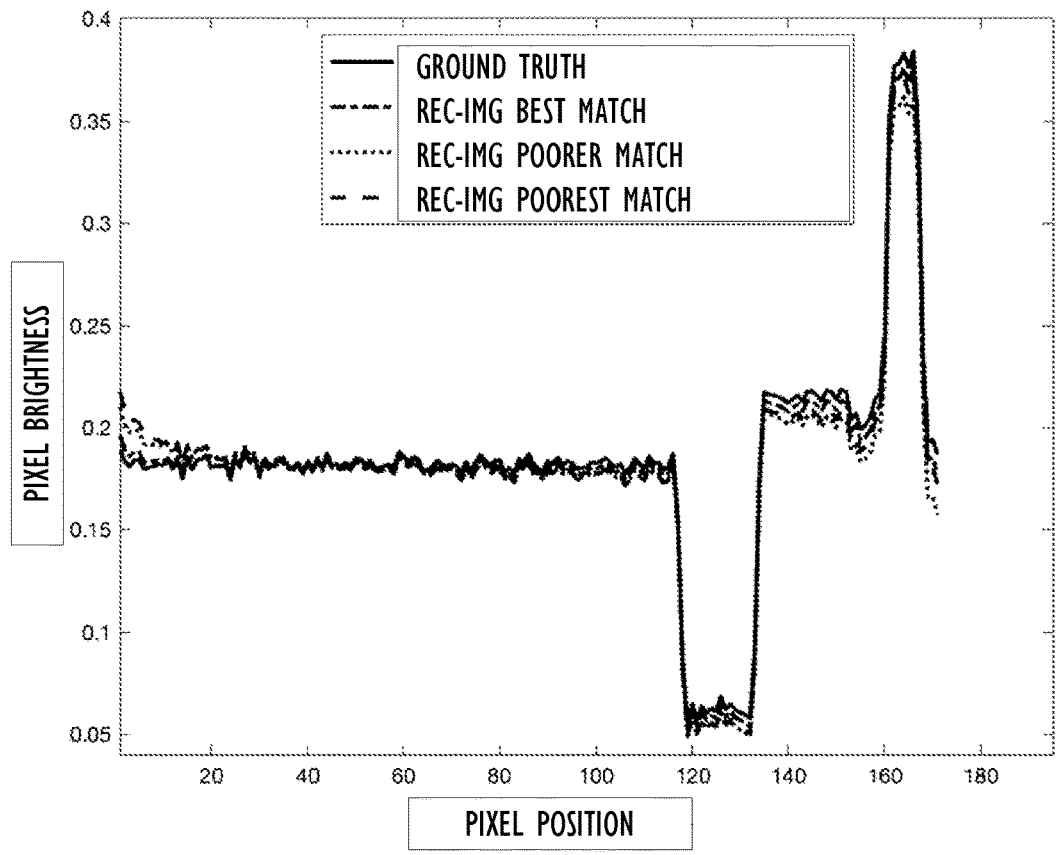

FIG. 4 compares different CT reconstruction techniques;

FIG. 5, FIG. 6 and FIG. 7 illustrate embodiments related to stored template sinograms.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Reference numbers, both in the description of the embodiments and in the claims, serve to illustrate the embodiments with reference to the drawings, without limiting it to these examples only.

The embodiments and features, if any, disclosed in the following description that do not fall under the scope of the independent claims are to be interpreted as examples useful for understanding various embodiments of the invention.

Figure 1:
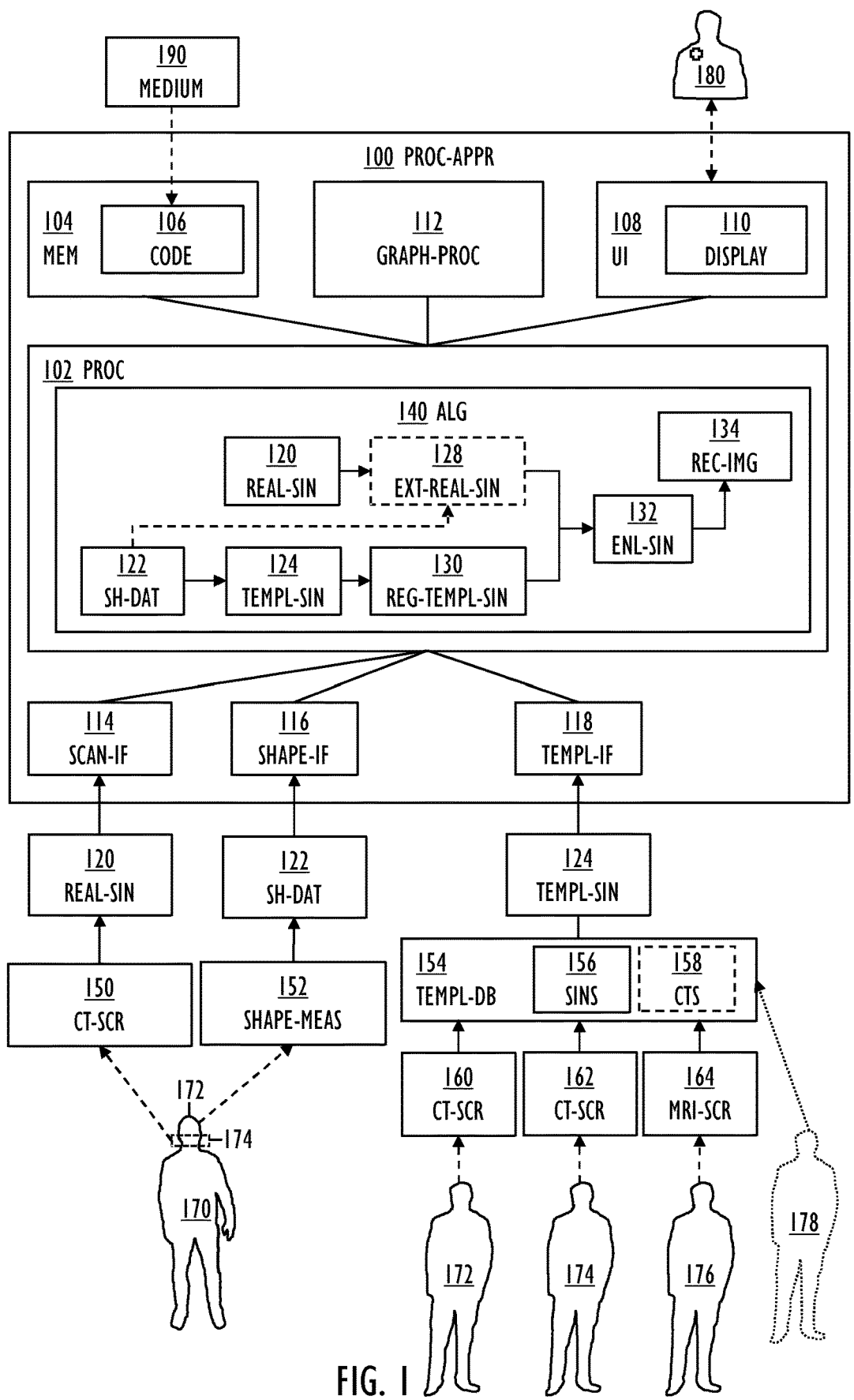
Figure 2:
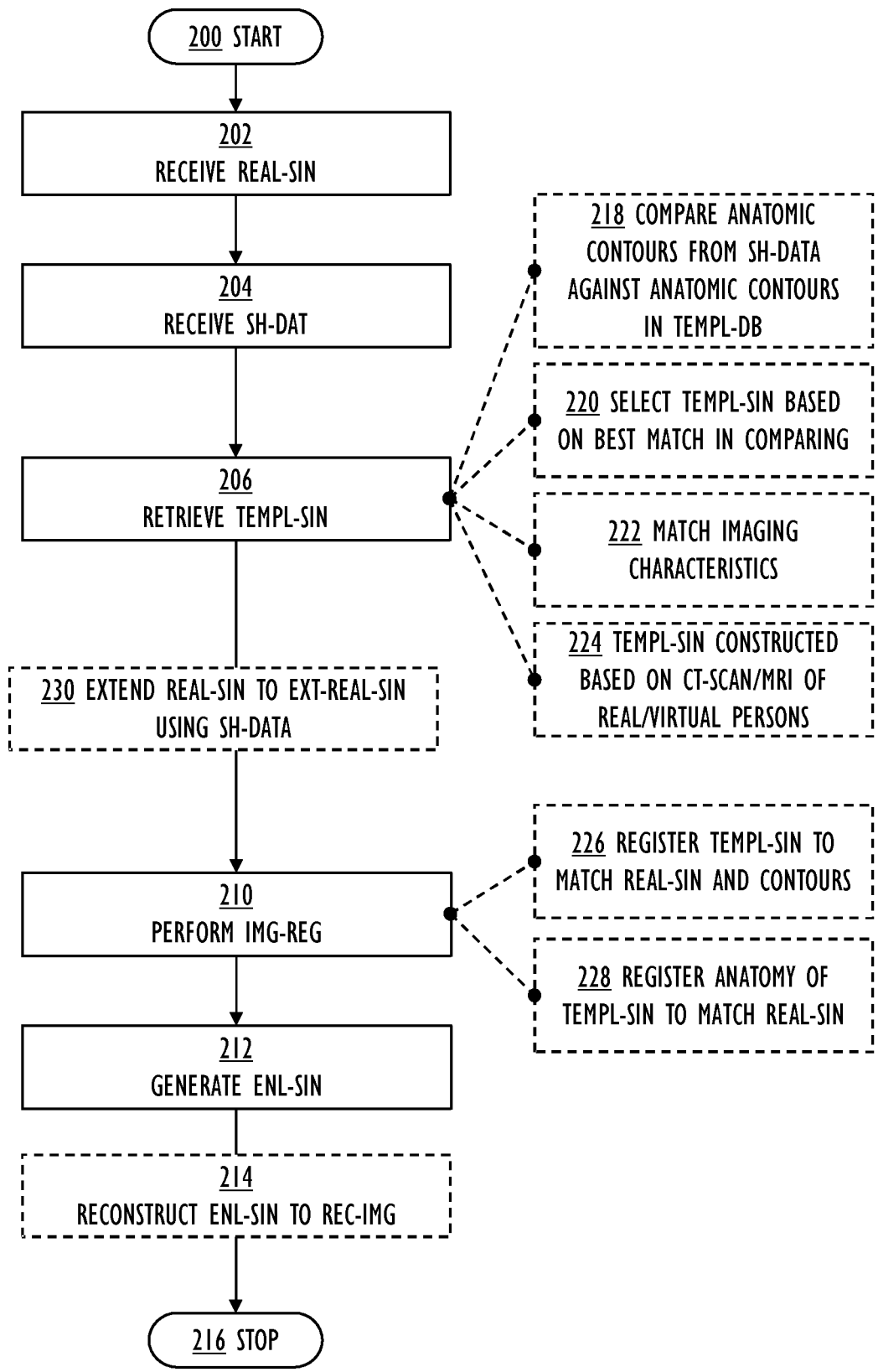
FIG. 2 is a flow chart illustrating embodiments of a method for processing CT scan data.

Let us study simultaneously FIG. 1, which illustrates embodiments of an apparatus 100 for processing CT scan data, and FIG. 2, which illustrates embodiments of a method for processing CT scan data. The method may be implemented as an algorithm 140 programmed as computer program code 106, executed by the apparatus 100 as a special purpose computer.

The apparatus comprises one or more memories 104 including computer program code 106, and one or more processors 102 to execute the computer program code 106 to cause the apparatus 100 to perform the method as an algorithm 140 for processing CT scan data.

The term 'processor' 102 refers to a device that is capable of processing data. Depending on the processing power needed, the apparatus 100 may comprise several processors 102 such as parallel processors, a multicore processor, or a computing environment that simultaneously utilizes resources from several physical computer units (sometimes these are referred as cloud, fog or virtualized computing environments). When designing the implementation of the processor 102, a person skilled in the art will consider the requirements set for the size and power consumption of the apparatus 100, the necessary processing capacity, production costs, and production volumes, for example.

The term 'memory' 104 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

A non-exhaustive list of implementation techniques for the processor 102 and the memory 104 includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

The computer program code 106 may be implemented by software. In an embodiment, the software may be written by a suitable programming language, and the resulting executable code may be stored in the memory 104 and executed by the processor 102.

An embodiment provides a computer-readable medium 190 storing the computer program code 106, which, when loaded into the one or more processors 102 and executed by one or more processors 102, causes the one or more processors 102 to perform the algorithm/method, which will be explained with reference to FIG. 2. The computer-readable medium 190 may comprise at least the following: any entity or device capable of carrying the computer program code 106 to the one or more processors 102, a record medium, a computer memory, a read-only memory, an electrical carrier signal, a telecommunications signal, and a software distribution medium. In some jurisdictions, depending on the legislation and the patent practice, the computer-readable medium 190 may not be the telecommunications signal. In an embodiment, the computer-readable medium 190 may be a computer-readable storage medium. In an embodiment, the computer-readable medium 190 may be a non-transitory computer-readable storage medium.

The computer program code 106 implements the algorithm 140 for processing CT scan data. The computer program code 106 may be coded as a computer program (or software) using a programming language, which may be a high-level programming language, such as C, C++, or Java, or a low-level programming language, such as a machine language, or an assembler, for example. The computer program code 106 may be in source code form, object code form, executable file, or in some intermediate form. There are many ways to structure the computer program code 106: the operations may be divided into modules, sub-routines, methods, classes, objects, applets, macros, etc., depending on the software design methodology and the programming language used. In modern programming environments, there are software libraries, i.e. compilations of ready-made functions, which may be utilized by the computer program code 106 for performing a wide variety of standard operations. In addition, an operating system (such as a general-purpose operating system) may provide the computer program code 106 with system services.

In an embodiment, the one or more processors 102 may be implemented as one or more microprocessors implementing functions of a central processing unit (CPU) on an integrated circuit. The CPU is a logic machine executing the computer program code 106. The CPU may comprise a set of registers, an arithmetic logic unit (ALU), and a control unit (CU). The control unit is controlled by a sequence of the computer program code 106 transferred to the CPU from the (working) memory 104. The control unit may contain a number of microinstructions for basic operations. The implementation of the microinstructions may vary, depending on the CPU design.

As show in FIG. 2, one or more graphics processors 112 may augment the processing related to the algorithm 140. The graphics processor 112 may be used in image processing to accelerate the creation of reconstructed CT images in a frame buffer intended for output to a display 110, for example.

A user interface 108 may be configured to interact with a user 180, such as a medical person (physician or dentist, for example), or a technician specializing in medical image processing. The user interface 108 may comprise, besides the display 110, additional equipment, such as a keyboard and means (such as a computer mouse) for focusing a cursor for user interaction. Note that the user interface 108 equipment may partly or wholly be external to the apparatus 100 itself and coupled communicatively to the apparatus 100.

In an embodiment, the apparatus 100 may comprise various communication interfaces. A scan interface 114 may be configured to receive a real sinogram 120 from a CT scanning of a region of interest 174 of a subject 170. A shape interface may be configured to receive shape data 122 representing anatomic contours of a body part 172 containing the region of interest 174 of the subject 170. A template interface 118 may be configured to retrieve a template sinogram 124 from a database 154 storing a plurality of template sinograms 156. In their simplest form, one or more interfaces 114, 116, 118 may be software interfaces configured to read data from one or more files and/or retrieve data from one or more databases. One or more interfaces 114, 116, 118 may also be communication interfaces configured to realize a communicative coupling of the apparatus 100 with one or more of the actors 150, 152, 154. Such communication interfaces 114, 116, 118 may may be implemented with a suitable standard/proprietary wireless/wired communication protocol, such as Ethernet, Bluetooth, Bluetooth Low Energy, Wi-Fi, WLAN, Zigbee, etc.

In an embodiment, the apparatus 100 may be a stand-alone apparatus 100 (a portable computer or a desktop computer, for example) as shown in FIG. 1, i.e., the apparatus 100 is a separate integrated unit, distinct from other system actors shown in FIG. 1. Such separate integrated unit may comprise a template database 154.

However, in an alternative embodiment, at least a part of the structure of the apparatus 100 may be more or less distributed or integrated with another apparatus shown in FIG. 1. For example, the apparatus 100 may be integrated into a system comprising a CT scanner 150 and a shape measurement apparatus 152. A template database 154 may also be integrated into such system. In another embodiment, the apparatus 100 is a networked server apparatus accessible through a communication network. The networked server apparatus 100 may be a networked computer server, which interoperates with the other actors according to a client-server architecture, a cloud computing architecture, a peer-to-peer system, or another applicable computing architecture.

Figure 3:
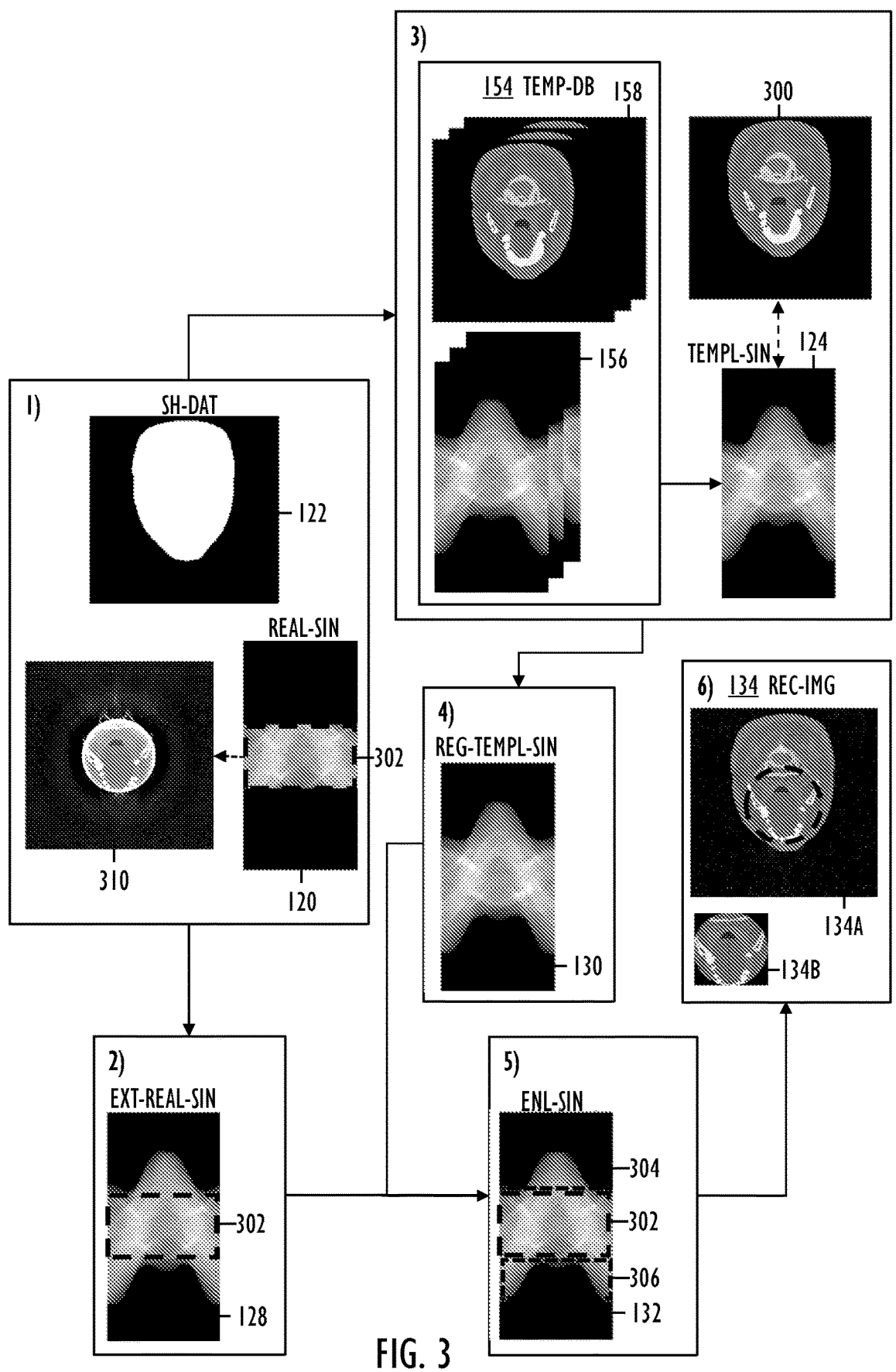
FIG. 3 illustrates embodiments of processing the CT scan data.

Let us now study the algorithm/method with reference to FIG. 2. Simultaneously, FIG. 3 is also referred to as processing of the CT scan data in six stages 1)-6) is illustrated. Note that even though FIG. 3 illustrates various CT images and sinograms as images, they are processed numerically in form of image matrices containing image pixel positions and their brightness values.

The method starts in 200 and ends in 216. Note that the method may run as long as required (after the start-up of the apparatus 100 until switching off) by looping from an operation 212 or 214 back to an operation 202.

The operations are not strictly in chronological order in FIG. 2, and some of the operations may be performed simultaneously or in an order differing from the given ones. For example, operations 202 and 204 may be executed in a different sequential order or even in parallel. Other functions may also be executed between the operations or within the operations and other data exchanged between the operations. Some of the operations or part of the operations may also be left out or replaced by a corresponding operation or part of the operation. It should be noted that no special order of operations is required, except where necessary due to the logical requirements for the processing order.

In 202, a real sinogram 120 from a CT scanning of a region of interest 174 of a subject 170 are received. In our embodiments, the region of interest 174 is the upper jaw and the lower jaw containing the teeth. Naturally, the embodiments may be employed to various other anatomic regions of the subject 170 such as various joints. As explained before, the real sinogram 120 may originate in real-time from a CT scanner 150, or the real sinogram 120 may be a result of an earlier CT scanning, even a long time ago. If such earlier CT scanning did not produce the real sinogram 120, the data (such as a CT image) from the earlier CT scanning may be forward projected to the real sinogram 120. Basically, any suitable CT scanner 150 producing the real sinogram 120 may be used. Specific imaging characteristics of the used CT scanner 150 may have to be taken into account, as will be described later. In an embodiment, Planmeca ProMax® 3D CT scanner 150 is used to produce the real sinogram 120. In an embodiment, the region of interest 174 is one or more teeth of the subject 170 and the body part 172 is the upper jaw or the lower jaw, or both the upper and the lower jaw.

As shown in FIG. 3, if the real sinogram 120 of the region of interest 174 were reconstructed into a reconstructed image 310, it would have disturbing image artefacts such as noise, bright border areas, bad visibility of areas around the region of interest 174, and elongation of areas around the region of interest 174, for example. However, concentrating the CT scanning to the region of interest 174 is preferable so that an excessive amount of radiation is avoided. Such region-of-interest tomography or interior tomography causes the aforementioned image artefacts as attenuation of surrounding tissue is not measured accurately.

In 204, shape data 122 representing anatomic contours of a body part 172 containing the region of interest 174 of the subject 170 is received. In our embodiments, the body part 172 is the head 172, but as explained before, the body part 172 may be knee, elbow or other body part containing the region of interest 174. The shape data 122 may also be generated in real-time or it may have been generated earlier by the shape measurement apparatus 152. Any suitable technology capable of producing measurement data describing anatomic contours of the body part 172 may be used. These technologies include, but is not limited to an optical stereo camera or any other device suitable for the photogrammetry, or an ultrasonic or optical rangefinder (such as a laser rangefinder). The shape data 122 may also be generated so that anatomic contours are detected and measured from another image taken from the body part 172. The other image may have been taken earlier as an image (instead of a CT image or a magnetic resonance imaging (MRI) image) employing some other imaging technology. In an embodiment, Planmeca ProMax® 3D ProFace® 152 is used to produce the shape data 122 as a realistic 3D face photo.

As shown in FIG. 3, the principle of shape data 122 is illustrated in the form of a cross-section such as a CT scanned image, but the shape data 122 may be pure numerical information describing the anatomic contours of the body part 172.

In 206, a template sinogram 124 is retrieved from among a plurality of stored template sinograms 156 based on the anatomic contours of the body part 172. As explained earlier, the plurality of stored template sinograms 156 may be stored in the template database 154, but also other data storage technologies may be used.

In an embodiment, each stored template sinogram 156 has been computed 224 based on one or more real CT scan images of one or more real persons 172, 174, and/or one or more MRI images of one or more real persons 176, and/or one or more CT scan and/or MRI images of one or more computer generated and/or imaging phantom and/or anatomic database virtual persons 178. In this way, the stored template sinogram 156 may be based on one or more real CT scan images of one real person 172. However, the stored template sinogram 156 may be based on one or more real CT scan images of two or more real persons 172, 174. In the similar way, the stored template sinogram 156 may be based on MRI image(s) scanned with an MRI scanner 164 from one or more persons 176. Also, virtual imaging with various techniques is covered, a virtual person 178 may be CT and/or MRI scanned in order to produce the stored template sinogram 156. The virtual person 178 may be a so-called imaging phantom (a specially designed object instead of a living subject or cadaver), or a computer-generated person (so-called computed imaging phantom), or a virtual person with a body part taken from a computer-generated anatomic database.

In an embodiment of 206, the template sinogram 124 is retrieved from among the plurality of stored template sinograms 156 so that imaging characteristics associated with at least a part of the plurality of stored template sinograms 156 match 222 imaging characteristics of a CT scanner 150 that produced the real sinogram 120. This may be implemented so that only template sinograms 156 scanned with the same kind of CT scanner 160 as the real sinogram 120 are included in the search space. The "same kind of" may refer to a specific manufacturer, or even to a specific model, or, more generally, to another manufacturer that is known to utilize substantially similar imaging characteristics (such as measurement geometry). Alternatively, or additionally, if the CT scanner 162 that produced the stored template sinogram has different imaging characteristics than the CT scanner 150 that produced the real sinogram 120, the stored template sinogram 156 may be transformed (computed and simulated) to be similar (= to match 222) regarding the underlying imaging characteristics as the real sinogram 120. Also, stored template sinograms 156 produced by other techniques, such as by the MRI scanner 164 or using the virtual person 178, may be transformed (computed and simulated) to be similar (= to match 222) regarding the imaging characteristics as those scanned by the CT scanner 150 that generated the real sinogram 120. Note that the stored template sinogram 156 may also be obtained as a result of a simulation based on a CT scanned image, wherein the simulation may transform the imaging characteristics to match 222 the imaging characteristics of the CT scanner 150 that produced the real sinogram 120. This option is useful if sinograms produced by the CT scanner 160, 162 cannot be accessed, but an access to the CT images scanned with the CT scanner 160, 162 is provided.

In an embodiment of 206, retrieving the template sinogram 124 from among the plurality of stored template sinograms 156 comprises two operations 218 and 220: in 218, the anatomic contours of the body part 172 as defined by the shape data 122 are compared against anatomic contours of the body part associated with each of the plurality of stored template sinograms 156, and in 220, the template sinogram 124 is selected based on a best match in the comparing 218.

As illustrated in FIG. 3, the stored template sinograms 156 may be associated with corresponding CT images 158. The selected template sinogram 124 is associated with a CT image 300 of the selected template sinogram 124. The CT images 300 may be utilized in searching and selecting the best matching template sinogram 156. Alternatively, or additionally, the searching and selecting may be based on the sinograms 156 only.

In an embodiment 230, the real sinogram 120 is extended into an extended real sinogram 128 by first simulating an attenuation in the body part 172 derived from the shape data 122 and extending the real sinogram 120 of the region of interest 174 into the extended real sinogram 128 using the simulated data for the surrounding tissues around the region of interest 174 in the body part 172. In the simulated attenuation, each pixel of the simulated sinogram of the body part 172 is given a value corresponding to the typical tissues: CT scanned images concentrating on teeth receive the linear attenuation coefficient of water for the adjoining soft tissues, for example.

In 210, an image registration is performed between the real sinogram 120 and the template sinogram 124 to obtain a registered template sinogram 130. Image registration refers to transforming different sets of data into one coordinate system. As a result, the real sinogram 120 and the registered template sinogram 130 are in the same coordinate system. In our embodiments, the real sinogram 120 retains its coordinates, and the template sinogram 130 is registered to use the same coordinate system.

In an embodiment 226 of 210, the template sinogram 124 is registered to match the real sinogram 120 and the anatomic contours of the body part 172. Naturally, this may also be implemented the other way around, or alternatively so that the common coordinate system is the native coordinate system of neither the real sinogram 120 nor the template sinogram 130. Note that if the optional operation 230 has been performed, the image registration in 210 is performed between the extended real sinogram 128 and the registered template sinogram 124; the template sinogram 124 is registered to match the extended real sinogram 128, which now also includes anatomic contours of the body part 172, for example.

In an embodiment 228 of 210, one or more anatomic features of the template sinogram 118 are registered to match the real sinogram 120.

In 212, an enlarged sinogram 132 is generated from the real sinogram 120 by adding the non-overlapping parts from the registered template sinogram 130.

In FIG. 3, the real sinogram 120 contains the data 302 (denoted with a rectangle marked with dotted white line) of the region of interest 174. The same data 302 passes through the processing as shown in the extended real sinogram 128 and the enlarged sinogram 132. As shown, the selected template sinogram 124 or the registered template sinogram 130 provides data 304, 306 of the surrounding tissues into the enlarged sinogram 132.

In an embodiment 214, the enlarged sinogram 132 is reconstructed to obtain a reconstructed image 134. The reconstructed image 134 may be reconstructed using traditional analytic methods (like filtered back-projection (FBP)), iterative reconstruction techniques, or artificial intelligence-based image reconstruction techniques, for example.

The reconstructed image 134A in full shows the complete body part 172. The display 110 may show the full reconstructed image 134A as it may be helpful to the user 180. However, as the body part 172 tissues surrounding the region of interest 174 may not match the reality, the reconstructed image 134B may be limited to the region of interest 172. When comparing the (hypothetical) reconstructed image 310 based on the real sinogram 120 having the artefacts, the reconstructed image 134B is free of such artefacts, the remarkable advantage of the described embodiments. The HU (Hounsfield Unit describing radiodensity) values are improved in the borderline area between the region of interest 174 and the surrounding tissues of body part 172.

The advantages of the described embodiments are next studied with reference to FIG. 4, FIG. 5, FIG. 6 and FIG. 7.

FIG. 4 illustrates the ground truth 400 (i.e. the ideal expected result) for the real sinogram 120. This is also illustrated in the diagram showing pixel positions in the X axis and the pixel brightness values in the Y axis. The filtered back-projection (FBP) produces a reconstructed image 402, which is relatively far-off from the ground truth 400. The adaptive detruncation AD (by Kolditz et al. mentioned earlier) produces a reconstructed image 404, which matches better the ground truth 400. However, as shown, the reconstructed image 134B produced by the described embodiments results in the best match with the ground truth 400.

FIG. 5 illustrates the significance of finding the best matching template sinogram 124. The ground truth 500 for the body part 172 CT image is compared with the corresponding CT images 300A, 300B, 300C of the selected template sinogram 124. As shown, the best matching CT image 300A corresponds with the ground truth 500 much better than the poorer matching CT image 300B and the poorest matching CT image 300C. The same result is also seen when comparing the real sinogram 120 with the enlarged sinogram 132A having the best match: the structures match relatively well, whereas in the enlarged sinograms 132B, 132C having poorer or the poorest match, the structures do no match very well as evidenced by the discontinuities in the structures.

FIG. 6 also illustrates the significance of finding the best matching template sinogram 124: as shown the reconstructed image 134A-1 based on selected template sinogram 124 of the best matching CT image 300A corresponds relatively well with the ground truth 500, whereas the reconstructed images 134A-2, 134A-3 of the poorer and poorest matching CT images 300B, 300C have falsely-shaped structures, discontinuities in the structures and even mild cupping pointed by the white arrows.

Finally, FIG. 7 also illustrates the significance of finding the best matching template sinogram 124: as shown the reconstructed image 134B-1 of the region of interest 174 based on selected template sinogram 124 of the best matching CT image 300A corresponds relatively well with the ground truth 400, whereas the reconstructed images 134B-2, 134B-3 of the poorer and poorest matching CT images 300B, 300C deviate the most in the diagram.

Even though the invention has been described with reference to one or more embodiments according to the accompanying drawings, it is clear that the invention is not restricted thereto but can be modified in several ways within the scope of the appended claims. All words and expressions should be interpreted broadly, and they are intended to illustrate, not to restrict, the embodiments. It will be obvious to a person skilled in the art that, as technology advances, the inventive concept can be implemented in various ways.

The invention claimed is:

1. An apparatus for processing computed tomography (CT) scan data, comprising:
   one or more memories including computer program code; and
   one or more processors configured to execute the computer program code to cause the apparatus to perform at least the following:
   receiving a real sinogram from a CT scanning of a region of interest of a subject performed by a CT scanner;
   performing an image registration between the real sinogram and a template sinogram to obtain a registered template sinogram;
   generating an enlarged sinogram from the real sinogram by adding non-overlapping parts from the registered template sinogram wherein, prior to the performing and the generating:
      shape data representing anatomic contours of a body part containing the region of interest of the subject is received from a shape measurement apparatus, wherein the shape data comprises measurement data describing anatomic contours of the body part generated by the shape measurement apparatus using an external surface scan of the body part without using CT scanning or magnetic resonance imaging (MRI) of the body part, wherein the shape measurement apparatus comprises an optical stereo camera or an optical rangefinder; and
      the template sinogram is retrieved from among a plurality of stored template sinograms, wherein the retrieving of the template sinogram comprises comparing the anatomic contours of the body part as defined by the shape data against anatomic contours of the body part associated with each of the plurality of stored template sinograms, and selecting the template sinogram based on a best match in the comparing; and
   generating a display including at least a portion of a reconstructed image by reconstructing the enlarged sinogram, the reconstructed image lacking one or more artefacts that otherwise would be present if the real sinogram were reconstructed in the region of interest.

2. The apparatus of claim 1, wherein the apparatus is caused to perform:
   registering the template sinogram to match the real sinogram and the anatomic contours of the body part.

3. The apparatus of claim 2, wherein the apparatus is caused to perform:
   registering one or more anatomic features of the template sinogram to match the real sinogram.

4. The apparatus of claim 1, wherein the apparatus is caused to perform:
   retrieving the template sinogram from among the plurality of stored template sinograms so that imaging characteristics associated with at least a part of the plurality of stored template sinograms match imaging characteristics of a CT scanner that produced the real sinogram.

5. The apparatus of claim 1, wherein a stored template sinogram has been computed based on one or more real CT scan images of one or more real persons, and/or based on one or more MRI images of one or more real persons, and/or one or more CT scan and/or MRI images of one or more computer generated and/or imaging phantom and/or anatomic database virtual persons.

6. A method for processing computed tomography (CT) scan data, the method comprising:
   receiving a real sinogram from a CT scanning of a region of interest of a subject performed by a CT scanner;
   performing an image registration between the real sinogram and a template sinogram to obtain a registered template sinogram;
   generating an enlarged sinogram from the real sinogram by adding non-overlapping parts from the registered template sinogram;
   wherein, prior to the performing and the generating:
      shape data representing anatomic contours of a body part containing the region of interest of the subject is received from a shape measurement apparatus, wherein the shape data comprises measurement data describing anatomic contours of the body part generated by the shape measurement apparatus using an external surface scan of the body part without using CT scanning or magnetic resonance imaging (MRI) of the body part, wherein the shape measurement apparatus comprises an optical stereo camera or an optical rangefinder; and
      the template sinogram is retrieved from among a plurality of stored template sinograms, wherein the retrieving of the template sinogram comprises comparing the anatomic contours of the body part as defined by the shape data against anatomic contours of the body part associated with each of the plurality of stored template sinograms, and selecting the template sinogram based on a best match in the comparing; and the method further comprising:
   generating a display including at least a portion of a reconstructed image by reconstructing the enlarged sinogram, the reconstructed image lacking one or more artefacts that otherwise would be present if the real sinogram were reconstructed in the region of interest.

7. The method of claim 6, further comprising: registering the template sinogram to match the real sinogram and the anatomic contours of the body part.

8. The method of claim 7, further comprising:
   registering one or more anatomic features of the template sinogram to match the real sinogram.

9. The method of claim 6, further comprising:
   retrieving the template sinogram from among the plurality of stored template sinograms so that imaging characteristics associated with at least a part of the plurality of stored template sinograms match imaging characteristics of a CT scanner that produced the real sinogram.

10. The method of claim 6, wherein a stored template sinogram has been computed based on one or more real CT scan images of one or more real persons, and/or one or more MRI images of one or more real persons, and/or one or more CT scan and/or MRI images of one or more computer generated and/or imaging phantom and/or anatomic database virtual persons.

11. A non-transitory computer-readable medium comprising computer program code, which, when executed by one or more processors, causes performance of operations for processing computed tomography (CT) scan data comprising:
- receiving a real sinogram from a CT scanning of a region of interest of a subject performed by a CT scanner;
- performing an image registration between the real sinogram and a template sinogram to obtain a registered template sinogram;
- generating an enlarged sinogram from the real sinogram by adding the non-overlapping parts from the registered template sinogram;
- wherein, prior to the performing and the generating:
  - shape data representing anatomic contours of a body part containing the region of interest of the subject is received from a shape measurement apparatus, wherein the shape data comprises measurement data describing anatomic contours of the body part generated by the shape measurement apparatus using an external surface scan of the body part without using CT scanning or magnetic resonance imaging (MRI) of the body part, wherein the shape measurement apparatus comprises an optical stereo camera or an optical rangefinder; and
  - the template sinogram is retrieved from among a plurality of stored template sinograms, wherein the retrieving of the template sinogram comprises comparing the anatomic contours of the body part as defined by the shape data against anatomic contours of the body part associated with each of the plurality of stored template sinograms, and selecting the template sinogram based on a best match in the comparing; and
- generating a display including at least a portion of a reconstructed image by reconstructing the enlarged sinogram, the reconstructed image lacking one or more artefacts that otherwise would be present if the real sinogram were reconstructed in the region of interest.

12. The apparatus of claim 1, wherein the one or more artefacts include noise, a bright border area, reduced visibility of an area around the region of interest, and/or elongation of an area around the region of interest.

13. The apparatus of claim 1, wherein the reconstructed image is reconstructed via filtered back-projection, iterative reconstruction, and/or artificial intelligence based reconstruction techniques.

14. The apparatus of claim 1, wherein the display includes more of the surrounding body parts and tissues beyond the originally available region of interest.

15. The apparatus of claim 1, wherein a Hounsfield Unit radiodensity measurement value in the reconstructed image within the normally available region of interest, proximate to a border between the region of interest and a surrounding body tissue part is improved relative to a corresponding area in a reconstruction based on the real sinogram.

16. The method of claim 6, wherein the one or more artefacts include noise, a bright border area, reduced visibility of an area around the region of interest, and/or elongation of an area around the region of interest.

17. The method of claim 6, wherein the display includes more of the surrounding body parts and tissues beyond the originally available region of interest.

18. The method of claim 6, wherein a Hounsfield Unit radiodensity measurement value in the reconstructed image within the normally available region of interest, proximate to a border between the region of interest and a surrounding body tissue part is improved relative to a corresponding area in a reconstruction based on the real sinogram.

19. The non-transitory computer-readable medium of claim 11, wherein a Hounsfield Unit radiodensity measurement value in the reconstructed image within the normally available region of interest, proximate to a border between the region of interest and a surrounding body tissue part is improved relative to a corresponding area in a reconstruction based on the real sinogram.

20. The non-transitory computer-readable medium of claim 11, wherein the template sinogram is retrieved from among the plurality of stored template sinograms so that imaging characteristics associated with at least a part of the plurality of stored template sinograms match imaging characteristics of a CT scanner that produced the real sinogram.

* * * * *